I. W. NONNEMAN.
DIESTOCK.
APPLICATION FILED APR. 30, 1919.
1,338,865.
Patented May 4, 1920.
2 SHEETS—SHEET 2.
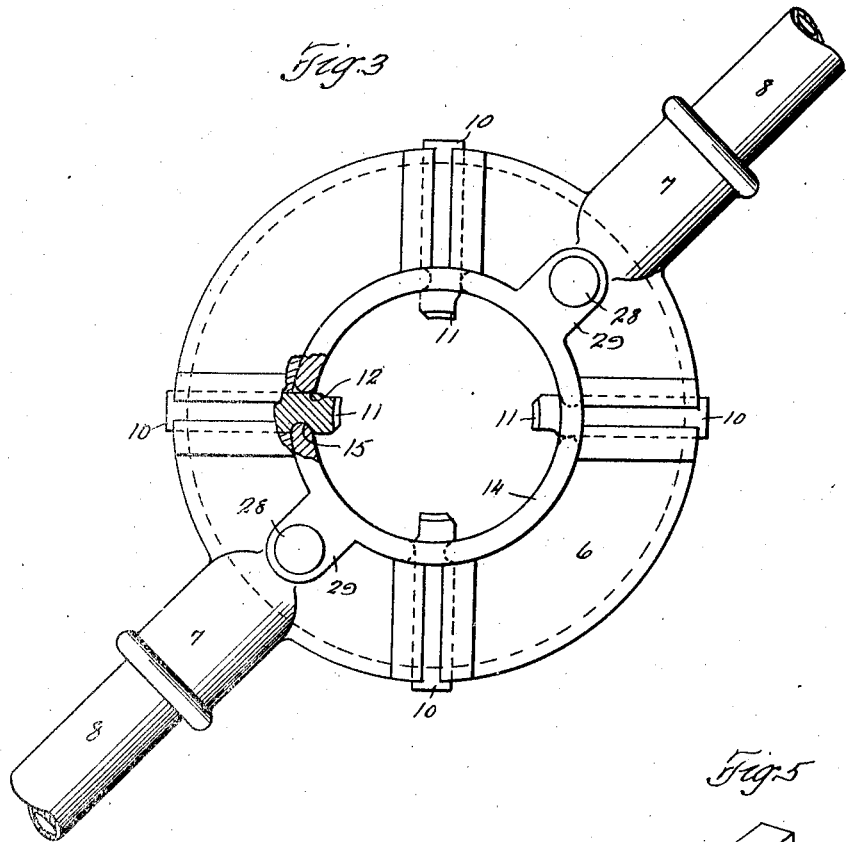
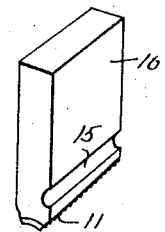
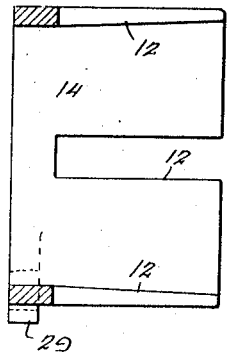
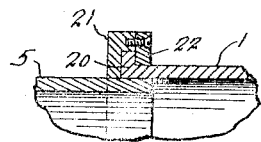
Inventor
Ira W. Nonneman
By Baker & Macklin,
Attorneys

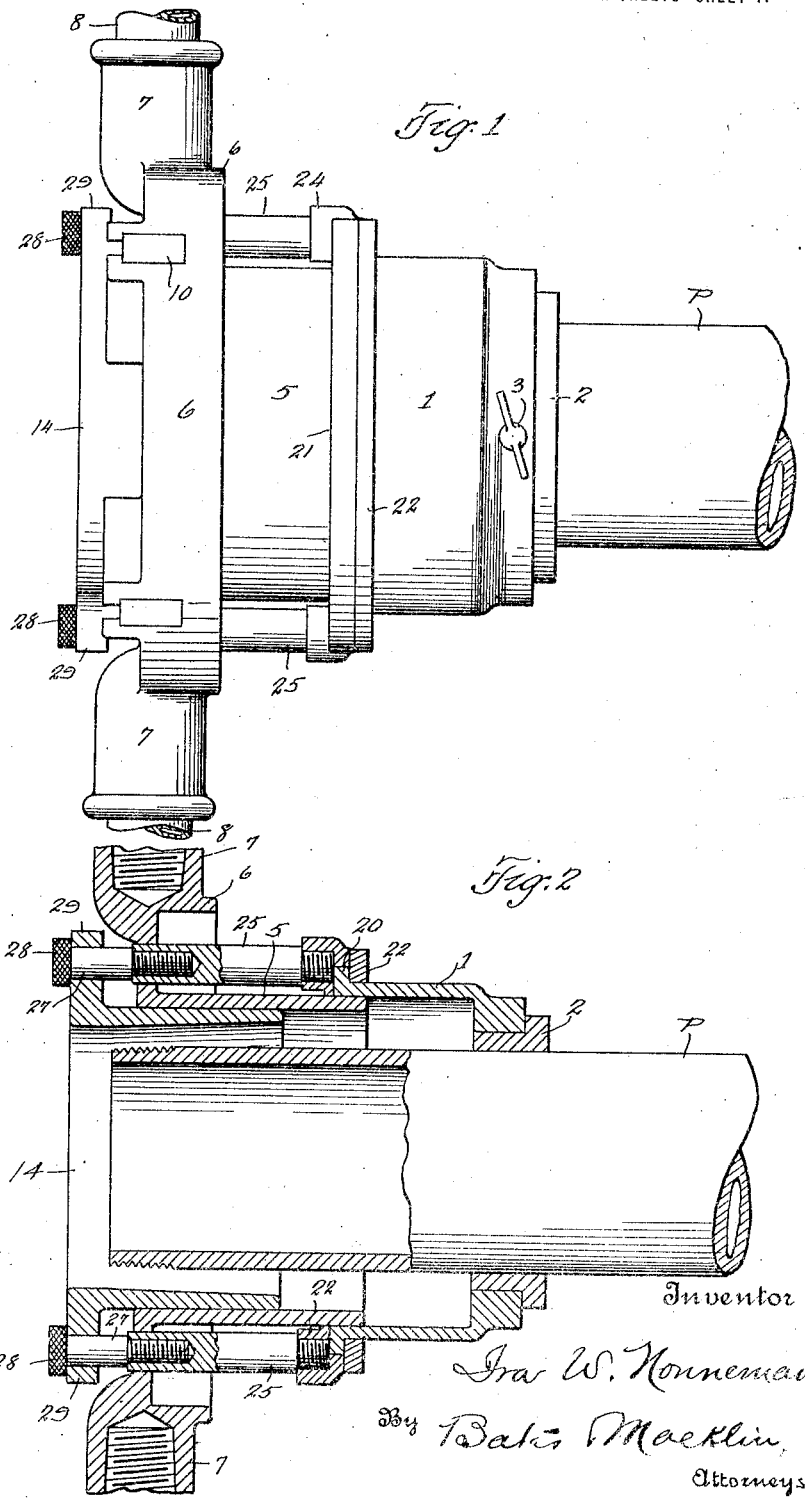
I. W. NONNEMAN.
DIESTOCK.
APPLICATION FILED APR. 30, 1919.
1,338,865.
Patented May 4, 1920.
2 SHEETS—SHEET 1.

UNITED STATES PATENT OFFICE.

IRA W. NONNEMAN, OF WARREN, OHIO, ASSIGNOR TO THE BORDEN COMPANY, OF WARREN, OHIO, A CORPORATION OF OHIO.

DIESTOCK.

1,338,865.  Specification of Letters Patent.  Patented May 4, 1920.

Application filed April 30, 1919. Serial No. 293,633.

*To all whom it may concern:*

Be it known that I, IRA W. NONNEMAN, a citizen of the United States, residing at Warren, in the county of Trumbull and State of Ohio, have invented a certain new and useful Improvement in Diestocks, of which the following is a full, clear, and exact description, reference being had to the accompanying drawings.

The essential object of this invention is the production of a simple, efficient die stock, of the chaser type in which means are provided for automatically controlling the recession of the chasers to cut a tapered thread. A more specific object is to provide means for causing the chasers to travel along the pipe during the first portion of the thread cutting operation without recession, to facilitate starting of a good thread and then, after the chasers have traveled along the pipe a given distance, to automatically start the recession of the chasers. An advantage of the construction by which I accomplish this is, that when backing the chasers off the thread there is a corresponding longitudinal movement of the chasers during which they do not move inwardly whereby the travel of the chasers off the thread is relieved. That is they do not closely engage the threads during this movement and the backing off is correspondingly easy.

Another object is to so construct the die stock that the chasers may be conveniently removed and replaced by chasers for cutting a left hand thread, or for threading different sizes of pipe.

The method of accomplishing the above and other objects appears in the following description which relates to the drawings illustrating a preferred embodiment of my invention. The essential characteristics are summarized in the claims.

In the drawings, Figure 1 is a side elevation of my die stock constructed in accordance with the present invention; Fig. 2 is an axial section through the same; Fig. 3 is a face view or front elevation thereof; Fig. 4 is a sectional detail of the tapered collar for controlling the recession of the chasers; Fig. 5 is a perspective of one of the chasers; Fig. 6 is a sectional detail through a relatively revoluble connection between the stationary collar and the chaser carrying frame.

In the drawings, P indicates a pipe to be threaded; 1 indicates a stationary guide collar having an opening surrounding the pipe and into which is fitted the usual removable bushing 2, to accommodate the collar 1 to the particular size of pipe being threaded. The interior of the collar 1 is cylindrically bored and rotatably fitting therein is the cylindrical exterior of a collar 5 integral with a chaser carrying frame 6. The chaser carrying frame comprises substantially a ring on which are formed radial slots to accommodate the chasers 10, while extending outwardly from the ring are integral bosses 7 threaded to receive the usual die stock handles 8. The collar 2 may be held in position by a thumb screw 3 extending through a portion of the collar 1, and serving to lock these collars rigidly to the pipe.

The chasers 10 are provided with the usual cutting teeth 11, and extend inwardly through longitudinal slots 12 in a substantially cylindrical collar 14, which slidably fits the cylindrical bore of the interior of the chaser frame collar 5. The sides of the slots 12 engage the inner portions of the chasers. The inner periphery of the collar 14 is tapered as shown and one side of each slot 12 engages and fits snugly into a groove 15 extending transversely of the chaser, while the side of the chaser opposite this groove abuts the other side of the slot 12. Longitudinal movement of the collar with relation to the chasers causes radial movement of the chasers and this longitudinal movement is accomplished by the advance of the chasers along the pipe as will be presently described.

As stated, both sides of the slots 12 are rounded so that each side may serve equally well to fit a groove 15 in the chaser or abut the flat side thereof. The result of this arrangement is that the chasers may be used in this die stock with the groove on either side thereof, for by the rounding of the sides of the slots each groove 15 may fit one side of the slot while the opposite side of the slot 12 serves as a shoulder to take the thrust on the chasers incident to the cutting.

On the guide collar 1 is a flange 20 embraced by a ring 21 which surrounds the periphery of the flange and fits against the radial face thereof, toward the chaser carrier, and is secured by a ring 22 fitting against the other side of the flange 20. This ring 21 is shown as provided with diametrically opposite bosses 24 threaded to receive pins 25 extending forwardly through the chaser carrying frame and slidably embraced thereby. Threaded in the forward end of each of these pins is shown a screw 27 having a knurled head 28 whereby it may be readily removed. The shank of this screw is preferably of slightly smaller diameter than the pin 25, and is slidably embraced by lateral outwardly extending ears integral with the collar 14, as shown at 29. Thus the bushing has a longitudinal movement relative to the guide frame 1, limited in one direction by the ears 29 engaging the heads 28 of the screws 27, and in the other direction by the ends of the pins 25.

The operation of my die stock is as follows: The guide collar 1 is first placed over the pipe and the screw 3 tightened to hold the collar in place, the tapered collar 12 is drawn outwardly until the ears 29 thereon abut the heads 28 of the screws. The chasers are then brought into engagement with the end of the pipe and the chaser frame is then rotated. Upon the first part of rotation of the frame, the chasers carry the chaser frame along the pipe as threads advance, and, as the ears 29 loosely engage the pin extensions 27, the collar 14 follows this movement of the chasers (the outward pressure of the chasers causing firm frictional engagement therewith) and does not permit recedence thereof until these ears engage the shoulders formed by the ends of the slightly larger pins 25. This stops the movement of the collar 14 along the pipe and the continued rotation causes the chasers to advance with a result that they are moved outwardly in exact relation to the taper of the collar 14, by reason of the engagement of the sides of the slots 12 with the notches or grooves 15 in the sides of the chasers.

When the die stock is backed off the thread, the first part of the longitudinal movement of the chasers carries the bushing 14 with them without inward movement of the chasers until the ears 29 abut the heads 28 of the screws 27. As the thread cut is tapered this relieves the close engagement of the chasers with the threads and renders the backing off movement easy. In other words, this operation is the result of a four-way movement of the chasers namely; first parallel to the axis of the pipe, then tapering outwardly, then on the return parallel with the axis again, then tapering inwardly until free from the threads.

To change the stock for different sizes of pipe, it is only necessary to substitute chasers of different length and change the guide bushing 2. The removal of the chasers is very readily accomplished by simply removing the screws 27 to permit withdrawal of the collar 14 whereupon the chasers may be removed either inwardly or outwardly from the radial slots of the chaser carrying frame.

Having thus described my invention what I claim is:—

1. In a die stock, the combination of a rotary frame, chasers carried by the frame for cutting threads, a tapered bushing slidably fitting the frame and internally tapered, slots extending from one end of the bushing to receive the chasers, shoulders on each chaser engaging a tapered portion of the bushing, the bushing being longitudinally slidable in the chaser frame, and a stop for limiting the longitudinal movement of the bushing.

2. In a die stock, the combination of a guide frame, a chaser frame rotatably connected therewith, a tapered bushing longitudinally slidable in the chaser frame, chasers having shoulders engaging the taper of said bushing, said bushing tending to move with the chasers as they advance along the pipe, and a stop for limiting such movement of the bushing whereby upon continued movement of the chasers they may recede by moving radially as they advance along the tapered surface.

3. In a die stock, the combination of a rotary frame, a bushing having its wall occupying the interior of the frame and slidable therein, the inner wall of said bushing being internally tapered, chasers carried by the frame and engaged by the tapered portion, said bushing extending inwardly and removable from the side of the chaser frame away from the end of the pipe.

4. In a die stock, the combination of a rotary chaser carrying frame, chasers carried thereby, a bushing slidably engaging the interior of the frame, the wall of the bushing being internally tapered, said chasers having shoulders engaging the taper of said bushing, said bushing being capable of short longitudinal movement in the chaser frame, equal to a portion only of the longitudinal movement of the thread to be cut, and said chasers being capable of movement along the taper of said bushing.

5. In a die stock, the combination of a guide frame, a chaser frame rotatably connected therewith, a bushing movable longitudinally in the chaser frame and having tapered shoulders, chasers carried by the chaser frame and having shoulders coacting with the taper of the bushing, the chaser frame being longitudinally movable for a greater distance than said bushing whereby subsequent movement of the chasers along the pipe causes the chasers to move along the taper.

6. In a die stock, the combination of a guide frame adapted to be rigidly secured to the pipe, a chaser carrying frame rotatably and longitudinally movable with relation to the guide frame, a rotatable collar on the guide frame, pins extending from said collar forwardly through and slidably engaging the chaser frame, a tapered bushing slidably fitting the interior of the chaser frame, chasers carried by the chaser frame and having shoulders engaging the tapered portions of said bushing and shoulders on said bushing adapted to engage the ends of said pins to limit movement of the bushing along the pipe and cause subsequent relative movement between the chasers and said bushing.

7. In a die stock, the combination of a guide frame, adapted to be attached to the pipe, a chaser carrying frame rotatably connected with and longitudinally movable with relation to the guide frame, a ring rotatable on the guide frame, pins rigidly carried by the ring slidably extending through said chaser carrying frame, a bushing slidably fitted into the interior of the chaser frame, and having a series of tapered shoulders, chasers carried by the chaser carrying frame, and having shoulders coacting with the tapered shoulders of said bushing, laterally extending ears on said bushing, screws having shanks slidably fitting said ears, and threaded into the ends of said pins, said shanks being smaller in diameter than said pins whereby the ears may engage the end of the pin to limit longitudinal movement of the bushing.

8. In a die stock, the combination of a chaser carrying frame, a bushing slidably fitting the interior thereof, and having longitudinal slots, and chasers carried by said frame and extending through said slots and having tapered shoulders, each side of each of the slots being arranged to fit the shoulder of one side of the chasers or serve as an abutment engaging the opposite side of the chaser.

9. In a die stock, the combination of a rotatable chaser carrying frame, a bushing slidably fitting the interior of the frame and having longitudinal slots extending from one end thereof, the sides of said slots being rounded, chasers radially slidable in said frame and having grooves to fit around the edges of said slots, said edges being tapered outwardly with relation to the axis of the pipe to be threaded, this rounded characteristic permitting the sides of the slots either to engage the grooves in the chasers or abut the opposite side thereof.

10. In a die stock, the combination of a chaser frame, a tapered bushing longitudinally slidable in the chaser frame, chasers having shoulders engaging the taper of said bushing, said bushing tending to move with the chasers as they advance along the pipe, and stops for limiting such movement of the bushing in each direction so that continued movement of the chasers may cause them to move radially as they advance along the tapered surface.

In testimony whereof, I hereunto affix my signature.

IRA W. NONNEMAN.